US012390768B2

(12) United States Patent
Rao et al.

(10) Patent No.: US 12,390,768 B2
(45) Date of Patent: Aug. 19, 2025

(54) BIMODAL REVERSE OSMOSIS AND PRESSURE RETARDED OSMOSIS FRAMEWORK

(71) Applicant: Purdue Research Foundation, West Lafayette, IN (US)

(72) Inventors: Akshay Krishna Rao, Folsom, CA (US); George Maged Elias, Elmhurst, IL (US); Stephen McCoy Coan, Hinsdale, IL (US); Luke Wrede, Mount Prospect, IL (US); David Martin Warsinger, West Lafayette, IN (US); Owen R Li, San Jose, CA (US); Sandra Patricia Cordoba Renteria, Chacarita Segunda Etapa Santande (CO)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/355,475

(22) Filed: Jun. 23, 2021

(65) Prior Publication Data

US 2022/0410067 A1    Dec. 29, 2022

(51) Int. Cl.
*B01D 61/06*    (2006.01)
*B01D 61/02*    (2006.01)
(Continued)

(52) U.S. Cl.
CPC ........... *B01D 61/06* (2013.01); *B01D 61/025* (2013.01); *B01D 61/08* (2013.01); *B01D 61/10* (2013.01);
(Continued)

(58) Field of Classification Search
CPC .... B01D 61/002; B01D 61/025; B01D 61/06; B01D 61/10; B01D 2311/26
See application file for complete search history.

(56) References Cited

U.S. PATENT DOCUMENTS

| 2004/0164022 A1* | 8/2004 | Solomon | F04B 9/115 |
| | | | 210/652 |
| 2009/0071902 A1* | 3/2009 | Stover | B01D 61/10 |
| | | | 210/637 |
| 2010/0183903 A1* | 7/2010 | McGinnis | B01D 61/025 |
| | | | 429/50 |

FOREIGN PATENT DOCUMENTS

CN     112709678 A  *  4/2021  ......... B01D 61/005

OTHER PUBLICATIONS

Blankert, Bastiaan, et al. "Facultative hybrid RO-PRO concept to improve economic performance of PRO: Feasibility and maximizing efficiency." Desalination 478 (2020): 114268. (Year: 2020).*

(Continued)

*Primary Examiner* — Bradley R Spies
(74) *Attorney, Agent, or Firm* — David E. Novak; Brannon Sowers & Cracraft PC (57) ABSTRACT

A method of operating a dual reverse osmosis/pressure retarded osmosis plant, including when electricity costs less than a first predetermined price, moderate salinity water is pumped into the first portion of a pressure vessel having first and second portions separated by a water permeable/salt impermeable osmotic membrane to yield desalinated permeate in the second portion and brine in the first portion. Further, when electricity costs greater than the first predetermined price, low salinity water is pumped into the second portion and brine is pumped into the first portion to yield pressurized moderate salinity water in the second portion which is run through an energy recovery device to generate electricity. The salinity of the low salinity water is lower than the salinity of the moderate salinity water, and the salinity of the moderate salinity water is lower than the salinity of the brine.

3 Claims, 9 Drawing Sheets

(51) Int. Cl.
  *B01D 61/08* (2006.01)
  *B01D 61/10* (2006.01)
  *B01D 61/12* (2006.01)
  *C02F 1/44* (2023.01)
  *C02F 103/08* (2006.01)
  *F03G 7/00* (2006.01)

(52) U.S. Cl.
  CPC ............... *B01D 61/12* (2013.01); *C02F 1/44* (2013.01); *F03G 7/015* (2021.08); *B01D 2311/14* (2013.01); *B01D 2311/20* (2013.01); *B01D 2311/26* (2013.01); *B01D 2313/18* (2013.01); *B01D 2313/243* (2013.01); *B01D 2313/246* (2013.01); *B01D 2313/50* (2013.01); *C02F 2103/08* (2013.01); *C02F 2209/005* (2013.01); *C02F 2209/03* (2013.01); *C02F 2209/05* (2013.01); *C02F 2303/10* (2013.01)

(56) References Cited

OTHER PUBLICATIONS

Lu J C—CN-112709678-A machine translation—Apr. 2021 (Year: 2021).*

* cited by examiner

BIMODAL REVERSE OSMOSIS AND PRESSURE RETARDED OSMOSIS FRAMEWORK

CROSS-REFERENCE TO RELATED APPLICATIONS

This patent application claims priority to U.S. provisional patent application No. 63/023,759, filed on May 12, 2021.

TECHNICAL FIELD

This disclosure generally relates to desalination, and more particularly to reverse osmosis and pressure retarded osmosis frameworks.

BACKGROUND

This section introduces aspects that may help facilitate a better understanding of the disclosure. Accordingly, these statements are to be read in this light and are not to be understood as admissions about what is or is not prior art.

Reverse osmosis (RO) desalination encounters economic challenges in increasingly renewable-dependent grids, where the price of electricity largely fluctuates due to variable power generation. Pressure retarded osmosis (PRO) is a closely related clean energy technology that, with current materials, struggles to produce enough power to justify capital expense at an industrial scale Thus, there is an unmet need for cost-effective and power-effective stems use high-selectivity, high-permeability membranes that combine the selectivity of RO while maintaining the high power density of PRO. The present novel technology addresses this need.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting. Further, in this disclosure, the figures shown for illustrative purposes are not to scale and those skilled in the art can readily recognize the relative dimensions of the different segments of the figures depending on how the principles of the disclosure are used in practical applications.

which is a possible value for either RO or PRO membranes and within the target range for the development of high selectivity membranes. The given salinity of the concentrate in the feed channel is compared to using pure water in the dilute channel. Pump and turbine efficiencies are assumed to be 85%, common conditions for the components operating at their best-efficiency-points.

FIG. 6 shows the variable cost economics of the technology of this disclosure. The net revenue is defined as the difference between the price of the outputs and the cost of the inputs. Water price refers to the sale price of permeate in RO and electricity price refers to the price at which electricity is bought or sold in RO or PRO. The peak price ratio relates the price at which energy is sold to the market electricity price. In analysis, it is assumed that the PRO process is performed using low salinity wastewater (15 ppt) and the brine from the RO process (80 ppt). The RO process is conducted with seawater (40 ppt) and a recovery of 0.5. In reality, the associated costs of all streams will vary by location to account for pretreatment, but this model aims to illustrate the fundamental trends carried by the cost and revenue of the processes. The peaks represent a switch between operational modes due to a maximization of profit, and are denoted by the black line. The area to the left of the line represents operation in RO, and the area to the right of the line represents operation in PRO.

DETAILED DESCRIPTION OF THE INVENTION

For the purposes of promoting an understanding of the principles of the disclosure, reference will now be made to the embodiments illustrated in the figures and specific language will be used to describe the same. It will nevertheless be understood that no limitation of the scope of the disclosure is thereby intended, such alterations and further modifications in the principles of the disclosure, and such further applications of the principles of the disclosure as illustrated therein being contemplated as would normally occur to one skilled in the art to which the disclosure relates.

Reverse Osmosis and Pressure Retarded Osmosis: Reverse Osmosis (RO) has been implemented in many forms to efficiently handle aqueous solutions of varying degrees of salinities with wide ranges of constituents. In contrast, Pressure Retarded Osmosis (PRO) is a relatively underdeveloped technology that harnesses the potential between a difference of salinity in water to produce energy. RO and PRO fundamentally have a large overlap in components required, although the operating conditions, requirements, and design specifications can largely vary. In both processes, saline water passes through a high pressure pump, enters a membrane module with a membrane that rejects salts, and then exits through energy recovery devices that reduce the pressure. However, while RO pumps provides enough pressure to overcome the osmotic pressure, in PRO the pressure is about half the osmotic pressure, thus retarding the osmotic pressure rather than overcoming it. In PRO, the pure water flows in the opposite direction across the membrane, substantially increasing the volume of the feed stream, which leads to net power produced from the pressure recovery devices.

The salt-rejecting membranes required for both systems are very similar but are differently optimized. RO membranes aim to increase selectivity and permeability, to produce cleaner water with higher throughput, and are designed to withstand high pressures. PRO membranes optimize permeability to increase power density and generally require less of a support structure as they operate in lower pressure environments. The membrane properties, structural parameter (S), and permeability to water and salts (A and B), have a significant effect on system performance metrics such as efficiency, power density (PRO), and selectivity (RO). These parameters affect the degree of concentration polarization, which decreases the effective osmotic pressure difference thus reducing the water flux.

The economics of industrial-scale systems are of concern for both RO and PRO processes, and a field-wide challenge is focused on improving component and system-level efficiencies. For most RO plants, a high and constant energy supply contributes to a significant portion of operational costs (Opex), making RO difficult to operate with renewable energy grids. Demand response technology could significantly improve the operational economics of RO, however many proposed systems also require an exorbitant increase in capital expenditure. Techno-economic studies of PRO have debated the economic feasibility of the stand-alone technology. Significant advancements in membrane technology along with application in highly saline environments may be able to increase the long-term viability of PRO. Other studies have proposed operating both RO and PRO together in a steady-state combination, with PRO acting as an energy recovery system.

The thin film composite membrane structure consists of an active layer and a series support structure layers. The active layer is designed to selectively pass water and reject salts. The support must allow the membrane element to withstand high pressures, but not hold a significant amount of salt within it. Active layer materials are ultra thin (10-500 nm) and highly selective to salts. Potential active layer options include Cellulose Acetate, Polyamide-hydrazide, Polypiperzine-amide, Polybenzimidazoline, Polyoxadiazole, Graphene, Polyfurane NS-200, Polyether-Polyfurane PEC-1000, Sulfonated Polysulfone, Polyethylenimine NS-100, Polyepiamine PA-300, Polyamide A-15, Polyamide 2UTC series, Polyamide 1FT-30, Carbon nanotube arrays, combinations thereof, and the like.

The membrane support structure may consist of 1-2 layers of highly porous and flexible materials of varied strength and thickness. Structures may be 3D printed to minimize tortuosity and thickness. Potential support structure materials include multi-walled carbon nanotubes, graphene, polysulfone, polyester, combinations thereof, and the like. Maximizing membrane permeability largely improves power density in PRO mode, but gives us marginal improvements in system level operation of RO mode. In general, the desired membrane water permeability >2 LMH/bar.

Maximizing membrane ion selectivity is helpful for producing clean water in RO and reduces concentration polarization in PRO. The desired membrane salt rejection is greater than 98%.

The structural parameter of using ultra-thin membranes vastly reduces the salt content stored in the membrane support layer, but often reduces its ability to withstand high pressures. The desired membrane tensile strength is at least 7 MPa. The desired membrane tortuosity is less than 10. The desired membrane porosity is greater than 0.75, and the desired membrane structural parameter is less than 1000 microns.

The membrane module designs impact boundary layer interactions, water flux, and energy efficiency. Spiral wound modules layer flat sheet membranes may be provided in a spiral pattern for a high surface-area to volume ratio. These membranes may be used if the system will be operating in RO for more than 90% of operation time. Hollow fiber modules use several long tube-like membrane structures. These modules have a lower surface-area to volume ratio than the spiral wound modules, but allow for vastly better counterflow performance. If the system is operating in PRO for >10% of operation time, hollow fiber modules should be used.

Electricity Grids and Pricing: Electric grid operators aim to maintain a balance between the generation of electricity and its use. When supply outpaces demand, electricity must be stored or rapidly used and the price effectively decreases. When demand outpaces supply, electricity must be rapidly generated and the price effectively increases. In this case, grid systems often use less efficient, more expensive fossil fuels to supplement energy production.

The intermittency and unpredictability of renewable energy generation causes significant fluctuations in power balance. The projected increase in reliance on renewable energy systems brings on the need for grid power smoothing technologies (such as batteries, compressed-air energy storage, pumped hydro energy storage, and the like). Grid instability also creates the need for incentivizing power pay-back programs, thus increasing the value of clean and cheap power generation.

Electricity pricing schemes are highly varied by area, depending on the forms of power generation used and their respective availability. Some schemes price electricity at a fixed average cost, while others set the price by the time of use, the amount requested, or other novel strategies. Each category of pricing strategies has a variety of specific guidelines and structures that are used to calculate how much a customer will pay and how much a provider will earn. Increased renewable energy use suggests a trend towards the more widespread use of time of use pricing schemes.

Both RO and PRO modes require a high pressure pump to achieve a desired hydraulic pressure relative to the osmotic pressure and a hydraulic motor or energy recovery device (ERD) to recover the fluid energy within the system. By controlling the fluid resistance in the system, the hydraulic pressure at the membrane module can be controlled. The pressure across the membrane sets the operational mode to RO or PRO, when greater or less than the osmotic pressure respectively. The framework proposes specifying an ERD that is capable of varying the fluid resistance by mechanical or electrical means. Mechanical methods involve the use of gearing or possibly a continuously variable transmission. Electrical methods involve varying electrical characteristics to alter the dynamics of the electromotive connection, such as through a variable frequency drive.

The realization of this system also depends on the scale. At the industrial scale, a pelton turbine can be used to recover fluid energy and drive an electromotive force. At the micro-hydraulic scale, a hydraulic motor is used. The addition of a small booster pump connected to the permeate storage tank is implemented to create flow in the dilute side during PRO mode. The design framework assumes pure water in the dilute section for maximum overlap between modes. However in practice, different salinities can be used for PRO, based on the process-specific cost, to maximize economic returns.

Figure 1:
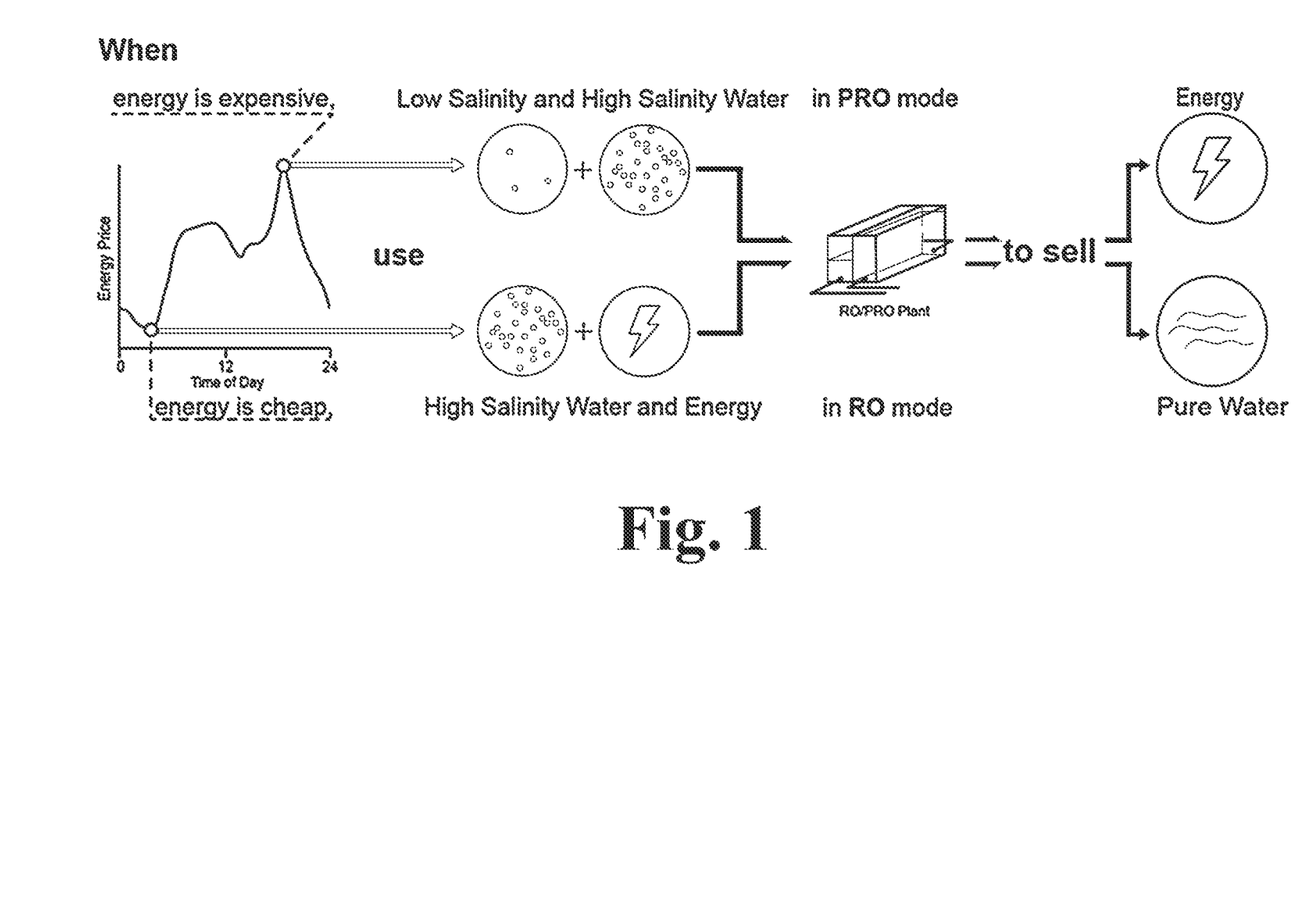
FIG. 1 provides a graphical summary of the concepts of the present disclosure.
Figure 2A:
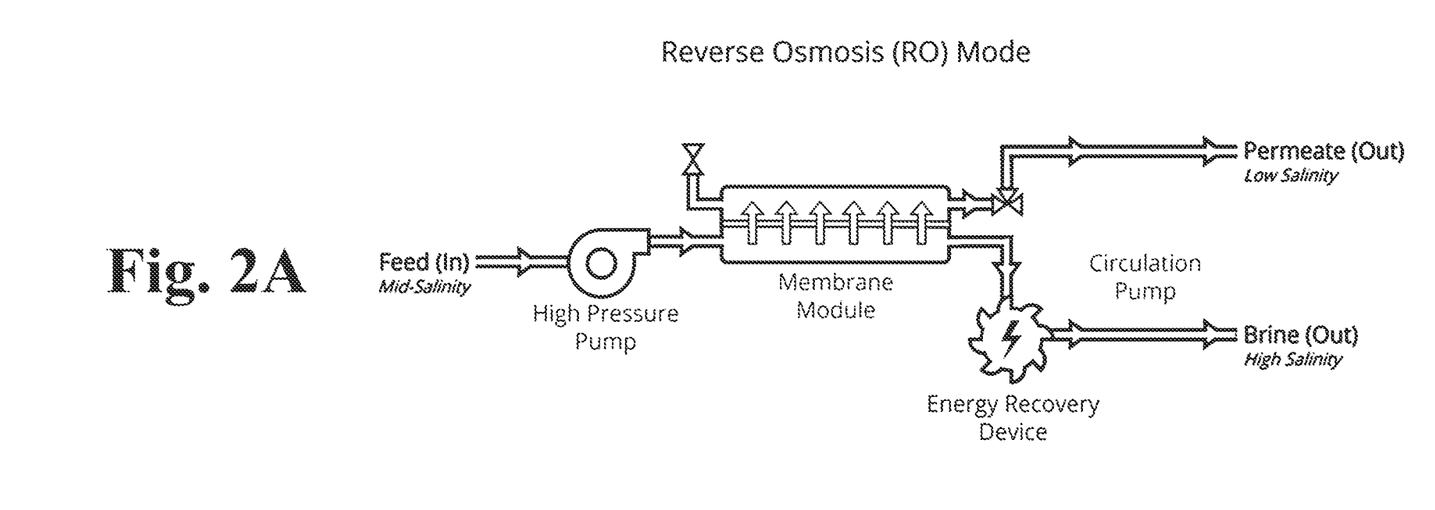
FIG. 2 shows that the bimodal system of this disclosure uses the same components for both processes. Section a. shows the flow path and active components required to operate RO mode. Similarly, section b. shows the flow path and active components required to operate PRO mode, achieved by decreasing pump pressure. The greyed out paths and components are not used for that step, and can be assumed to be closed off with valves. The energy recovery device component is realized by a component that converts hydraulic pressure energy to electrical energy. The approach uses the same components found in PRO, and only adds a circulation pump and valves to typical RO.
Figure 2B:
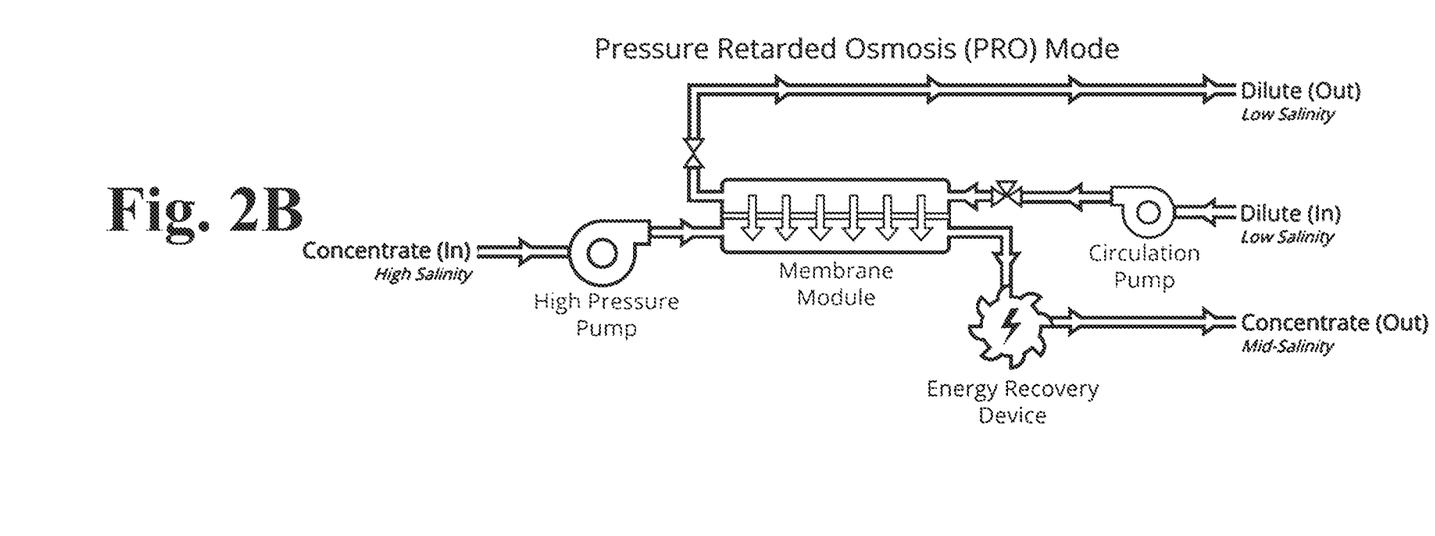
Figure 3:
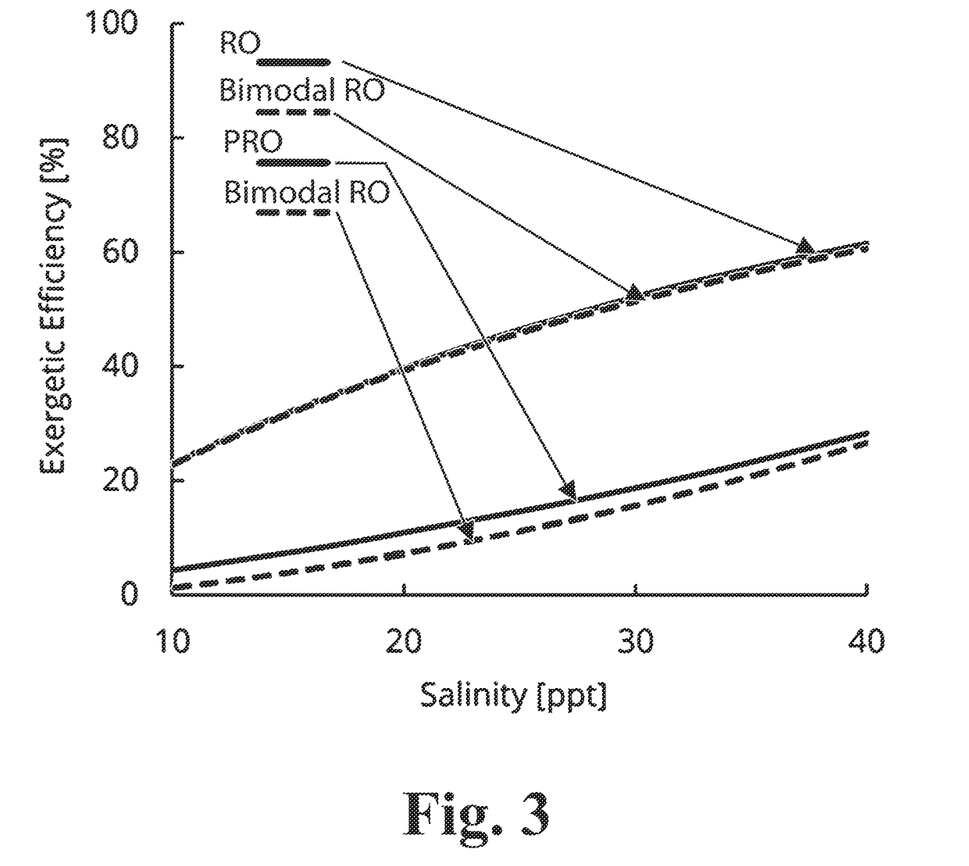
FIG. 3 shows system trade-offs between stand-alone and bimodal processes. The nominal system exergetic efficiencies are shown as solid lines while the operation of the bimodal system in its respective modes are shown as dotted lines. The stand-alone RO system assumes an energy recovery device specified at its best efficiency point, approximately 90% efficiency. The Bimodal RO system requires the hydraulic motor or turbine to be specified over a wider range of operating conditions, assuming a lower efficiency of about 80%. Standard (unimodal) PRO systems use flux-optimized membranes (A=7, S<100) while the bimodal system requires RO membranes (A=0.6, S>1000) to maintain the selectivity in RO mode.

FIG. 2 shows the simplest implementation of the framework, with a turbine or hydraulic motor as a single ERD. Other implementations could use combinations and variations of pressure exchangers and turbines to recycle fluid power within the system and produce electric current.

METHODS: System Performance: The RO and PRO systems were modeled using a 1D-discrete numerical model that considers concentration boundary layers and calculates mass transport of water and salts at each location. Equations for the RO and PRO components are as follows, which relate energy and costs.

The system performance is modeled by calculating the net energy production or consumption and respective process efficiency by using the permeate flux and desired hydraulic pressure. The feed refers to the incoming high salinity stream in PRO, and the incoming stream in RO. The simplified flux was expanded, to account for concentration polarization and the reverse permeation of salt, with the permeate solution salinity approaching zero.

$$J_w \approx A(\Delta\pi - \Delta P) = A\left(\frac{\pi_f e^{-\frac{J_w S}{D}} - \pi_p e^{-\frac{J_w}{k}}}{1 + \frac{B}{J_w}\left[e^{\frac{J_w S}{D}} - e^{\frac{J_w}{k}}\right]} - \Delta P\right)$$

The membrane flux was modeled, assuming flux is positive in PRO. $J_w$ is the flux of water across the membrane, A is the membrane permeability to water, $\Delta\pi$ is the osmotic pressure difference, and $\Delta P$ is the hydraulic pressure difference across the membrane. S is the membrane support layer structural parameter, k is the mass transfer coefficient in the membrane module, B is the membrane permeability to salts, and D is the diffusivity of salt in water. Subscripts f and p represent the feed and permeate in RO or the concentrate and dilute in PRO. The system was evaluated by the exergetic, or second law, efficiency and the membrane power density of PRO. The power density of the PRO process is defined on a basis of membrane area.

$$W^* = J_w \Delta P$$

where W* is the power density. The exergetic efficiency is calculated as a function of the process net work and the respective process least or maximum work.

$$\eta_{II,RO} = \frac{W_{least}}{W_{net,RO}}$$

$$\eta_{II,PRO} = \frac{W_{net,PRO}}{W_{max}}$$

where $\eta_{II}$ and W are the exergetic efficiency and work. Subscripts II and net represent the second law and the real or net amount. The least work of reverse osmosis is defined as the minimum energy of separation.

$$W_{least} = m_p\left[(g_p - g_b) - \frac{1}{r}(g_f - g_b)\right]$$

where m represents the mass flow rate, the recovery ratio is represented by a ratio of permeate to feed flow rates $$r = \frac{m_p}{m_f},$$

and g is the Gibbs free energy of the respective solution. We assume PRO operates at the max power density $$\frac{\Delta\pi}{2}$$

of and RO operates at a pressure associated with a standard recovery of r=0.5. Therefore, in RO, the flux equation calculates the desired set point pressure, while in PRO the same equation is used to calculate the permeate flow rate. The maximum work of pressure retarded osmosis was defined as the maximum extractable work from salinization, or the opposite of the respective least work.

$$W_{max,PRO} = -W_{least,RO}$$

The model was simplified to represent a single high-pressure pump (HPP) and energy recovery device (ERD) with associated effective efficiencies. The net work is calculated as a summation of the input and output work.

$$W_{net} = \frac{V_f \Delta P_{HPP}}{\eta_{HPP}} + \eta_{ERD} V_b \Delta P_{ERD}$$

where V is the volumetric flow rate and subscripts b, HPP, and ERD represent the brine in RO or outlet concentrate in PRO, high pressure pump, and energy recovery device, respectively.

Bimodal System Variable Cost and Revenue: The relative economic profit of each system was calculated for a given combination of system operational inputs (feed salinity, flow rate, component efficiency, etc.) as costs and economic inputs (price of pure water and price of electricity) as revenue.

$$R_{RO,net} = (C_p m_p + C_b m_b) - \left(\frac{W_{least}}{\eta_{II,RO}} C_e + C_f m_f\right)$$

$$R_{PRO,net} = (W_{max}\eta_{II}C_e + C_f m_f) - C_p m_p + C_b m_b)$$

Where R and C represent the net revenue and cost or selling price associated with the respective water or electricity source. The least and maximum process work were calculated via the performance modeling equations above. The system of equations to determine a relationship between the component efficiency and the exergetic efficiency for each mode was solved in the Engineering Equation Solver software and exported to Matlab for data handling and plotting.

The peak price ratio is the ratio between the sale price of electricity for producers and the baseload cost of electricity for consumers where the economic surplus from RO and PRO are equal. This factor accounts for any additional incentives for producing electricity during peak hours.

$$PPR_e = \frac{1}{W_{max}\eta_{II}C_e}[R_{RO,net} + (C_p m_p + C_b m_b - C_f m_f)]$$

The equilibrium peak price ratio ($PPR_e$) is found by setting the net revenue from PRO and RO equal to each other and rearranging the equation. In this study, it is assumed that the PRO process is performed using low salinity wastewater (5 ppt) and the brine from the RO process (70 ppt). The RO process is conducted with seawater (35 ppt) and a recovery of 0.5. Both processes are conducted with a component efficiency of 90%. In reality, the associated costs of all streams will vary by location to account for pretreatment, but this model assumes a value of zero to illustrate the fundamental trends carried by the cost and revenue of the processes.

Bimodal Implementation Trade-Offs: The bimodal system requires selectivity and membranes with the ability to withstand high hydraulic pressures to effectively operate in RO. Since the PRO process is proposed for grid payback, the energy recovery device, which is usually a pressure exchanger in RO, must convert the pressure energy to electric current. The efficiency tradeoff of the bimodal system involves use of a less efficient energy recovery device for operation in RO and less optimized membranes for operation in PRO. Turbines specified for a wide range of pressures are generally less efficient, and the use of pressure exchangers in both RO and PRO can increase the efficiency as much as 5%. The bimodal system costs efficiency in both processes, but the efficiency loss is much more significant in PRO (5%), compared to RO (1%). This occurs because the effect of concentration polarization (CP) in the PRO process is significantly accentuated by the thick support layer of RO membranes. CP decreases the flux, which decreases the total recoverable work of the process.

The total extractable work from PRO is given by the outlet volumetric flow rate at the operating pressure. Increasing the membrane structural parameter increases the concentration polarization effect, thus decreasing the total flux. At approximately S>10,000 (for the given parameters), the system will not produce power due to the losses overcoming or being equivalent to the effective power generation. Optimized membranes for the bimodal system will have low permeability to salts for the RO process, high permeability to water for both processes, and a low structural parameter for the PRO process.

Economic Analysis: The exergetic efficiency represents how effectively a system converts given inputs to produce output. The concept can similarly build a relationship between cost and revenue. A bimodal system will operate in the mode which produces the most profit. Therefore, given a price of water and electricity, the efficiency of the system determines the equilibrium between producing water or energy for sale. As the cost of electricity increases, generating energy, operating in PRO, will always be more favorable. As the sale price of water increases, desalination becomes more favorable.

Figure 4:
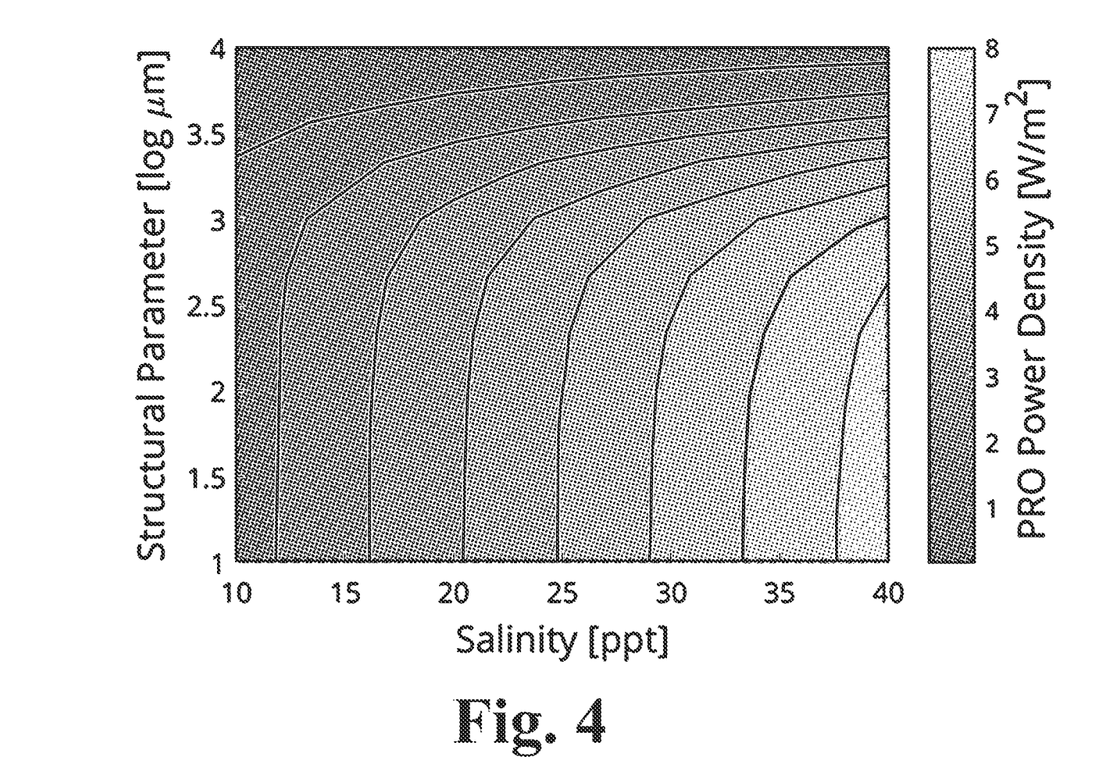
FIG. 4 shows the effect of membrane structural parameter on power D\density in PRO. The membrane permeability (A) was assumed to be $$2\frac{L}{m^2 hrbar},$$
Figure 5:
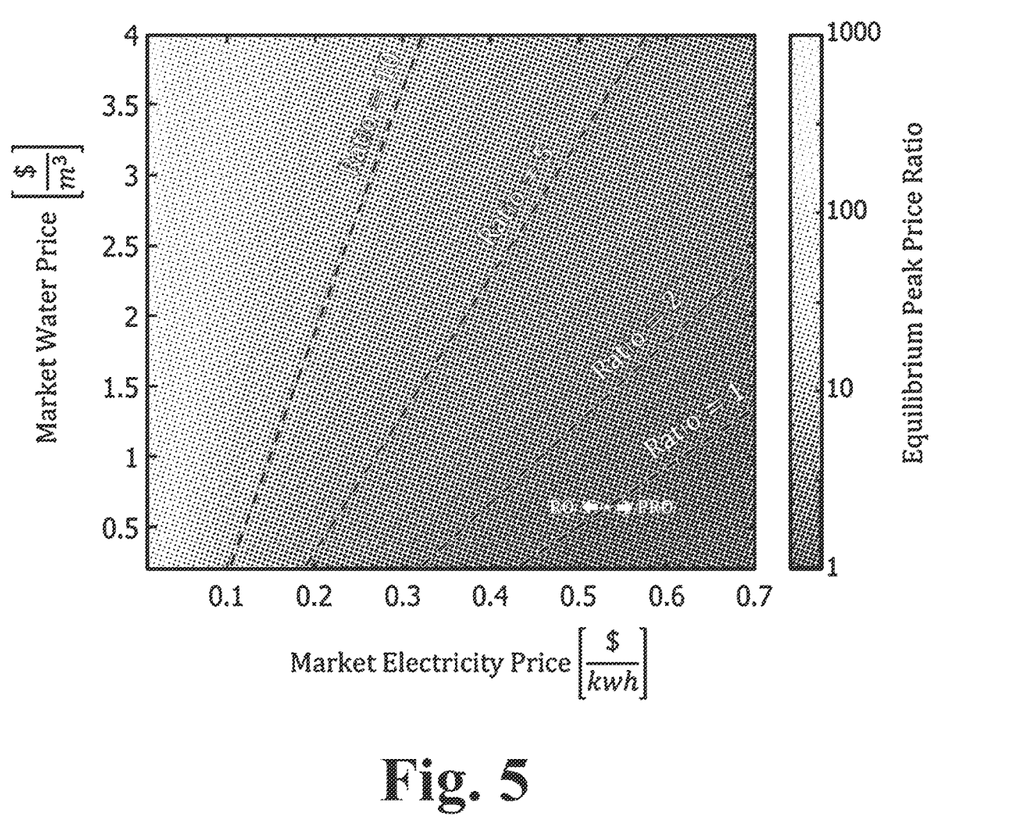
FIG. 5 shows operational decision map relating to this disclosure. The peak price ratio is the ratio between the sale price of electricity for producers (PRO) and the nominal cost of electricity for consumers (RO). The contour shows the equilibrium price ratio, where the net revenue from RO and PRO are equal. The market water price refers to a given sale price of permeate in RO and the market electricity price refers to the price at which electricity is bought or sold in RO or PRO. The dotted lines represent specific ratios that may exist within reasonable pricing schemes. The white circle shows a given water price and price ratio and the arrows describe the most profitable mode for a given electricity price. Further exploration of system variables can be found in FIG. 6
Figure 6:
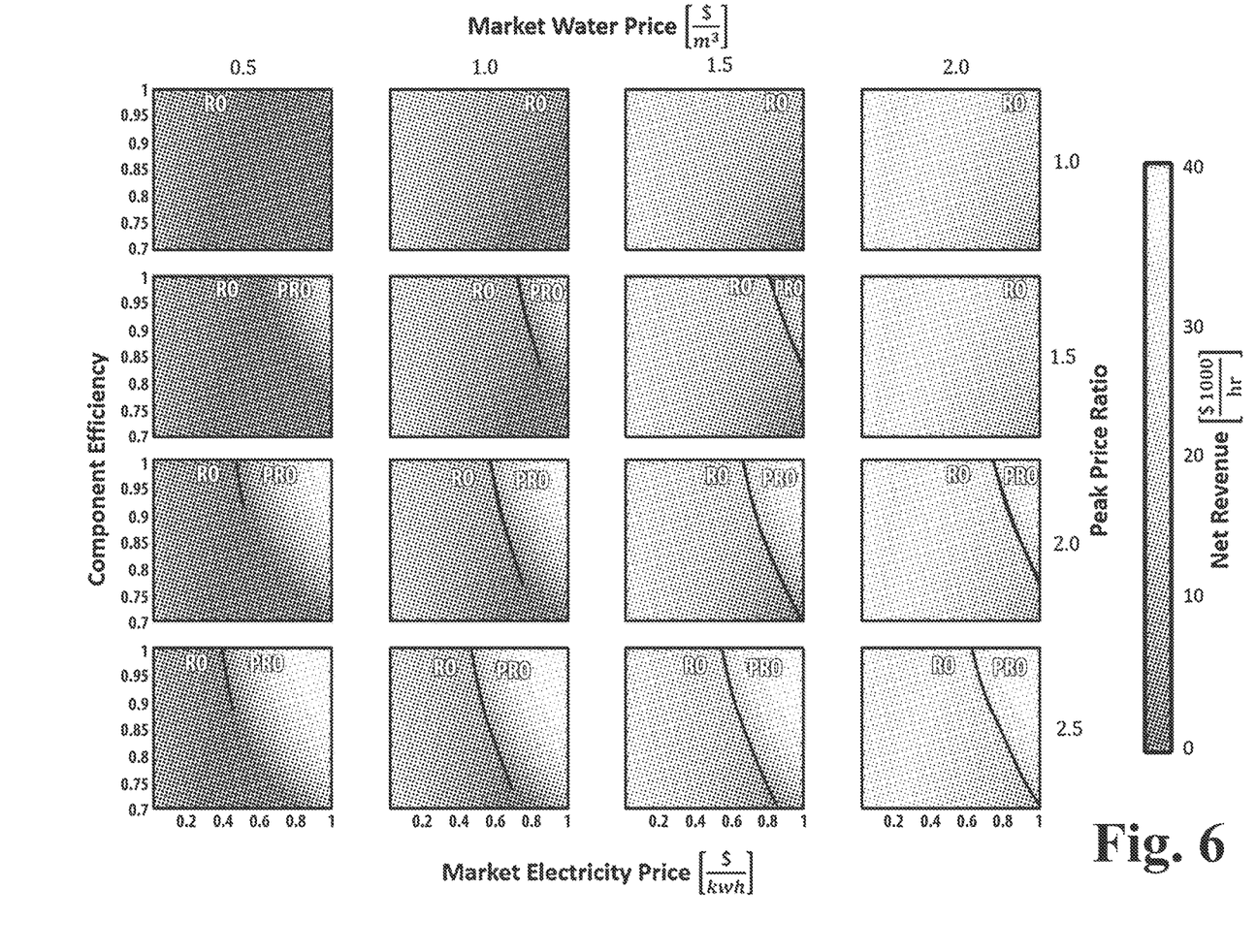
Figure 7:
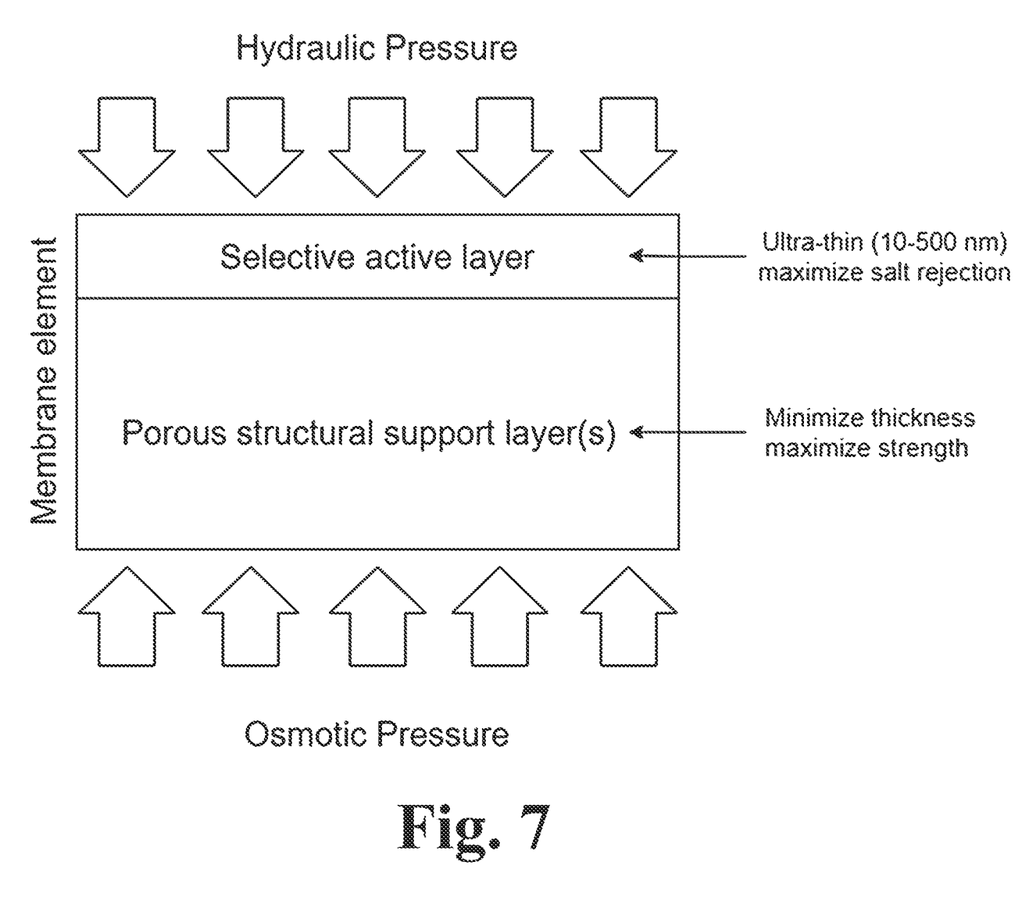
FIG. 7 graphically illustrates hydraulic and osmotic pressure on a membrane module.
Figure 8:
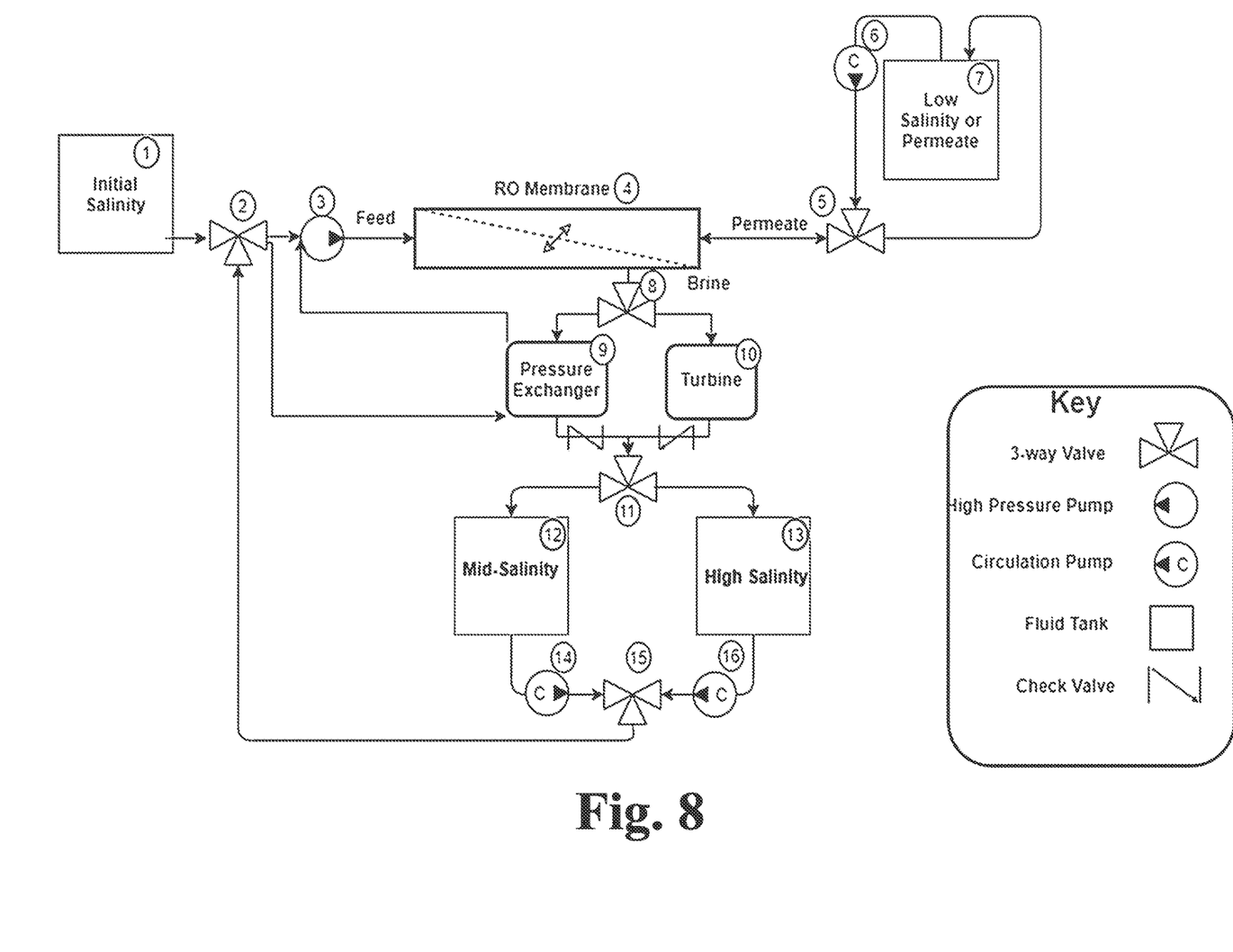
FIG. 8 is a schematic illustration of a RO/PRO enabled desalination system.

The operation of PRO in the bimodal system can allow it to produce more profit than the operation of RO in a reasonable regime of conditions, as shown in FIG. 4. Above a baseload electricity price of $$0.40 \; \frac{\$}{kwh}$$

bimodal operation in the PRO mode can be advantageous to operation in the RO mode without additional incentive. However, as the market price of water increases, producing pure water via RO becomes more profitable. Further, specific electricity pricing schemes may incentivize producing energy at peak hours, thus decreasing the minimum market electricity price for advantageous operation of PRO.

The developed framework proposes an integration of desalination via reverse osmosis and energy generation via pressure retarded osmosis. As standalone systems, unimodal RO and PRO face economical challenges in an evolving renewable-based electric grid. The interplay between the system modes allows for a two-mode optimization of profit on the sale of electricity or water. This ensures the plant can maximize profit with respect to the electricity price and can be adapted to fit varying electricity pricing schemes.

Advancements in membrane technology for optimizing the bimodal system are similar to general goals of increased selectivity and permeability of membranes. PRO optimized membranes have significant advantages over RO optimized membranes in power density and efficiency of the energy generation process, but lack the ability to withstand the RO process and selectively filter salts. Decreasing the membrane support layer structural parameter of RO membranes while maintaining selectivity would increase the power density in PRO while maintaining functionality in RO.

The net revenue for PRO operation is proportional to the market electricity price and peak-price ratio, while inversely proportional to the market price of water. Oppositely, the net revenue for RO operation is proportional to the market price of water and inversely proportional to the price of electricity. A net revenue analysis of the bimodal operation shows that a PRO process using RO brine can be more profitable than the RO process, in reasonable ranges of electricity pricing, as low as $$0.40 \; \frac{\$}{kwh}.$$

The minimum electricity price for PRO operation decreases as the pricing structure offers more financial incentive for energy production.

The bimodal RO and PRO system and standard RO system have a large overlap in required components. Many of the additional components used in the bimodal system are also commonly used elsewhere in desalination systems. This suggests that the capital expense associated with a bimodal variation should be similar to its stand-alone RO counterpart.

While this framework is aimed at grid power smoothing for the issue of grid stability with renewable energy sources, further study must consider how converting a large portion of a grid's power demand to power supply will affect an interconnected grid system. Additionally, case studies comparing the viability of the bimodal system with respect to common price structures will lead to further optimization of the implementation of this framework.

Design enabling artificial intelligence—The RO-PRO system operates by tuning the resistance in the hydraulic circuit, relative to the osmotic pressure of the saline feed. Directional valves, connecting the brine and feed streams, allow tuning the salinity that the membrane sees, thus controlling the osmotic pressure. Bi-directional membrane modules allow for pure water flux to desalination or recombine. These three design features allow this system to dynamically shift between operating above (RO) or below (PRO) the osmotic pressure, as well as with low salinity or high salinity feed. This is a dynamic process having fixed geometry while accommodating change over time. The transient time-constant is associated with the size and/or length of the pipes. Pressure exchanger designs may take advantage of this by minimizing the effect of transience. Energy recovery devices with fluid-fluid contact sacrifice some energy losses in mixing but are able to have a more flexible design. Energy recovery devices with rotary components coupled via a direct-drive shaft may incur significant energy losses when operated dynamically, or outside the best efficiency point. The initial salinity feed source for RO may have a salinity varying from 1 gram salt/kg water to 40 grams salt/kg water. The mid salinity tank may have a salinity from 1.2 to 57 g/kg (25-40% higher than the initial feed). The brine salinity tank may have a salinity from 1.6 to 100 g/kg (66-150% higher than the initial feed). The permeate source for PRO may be wastewater (pretreated with chemical dosing or filtration), grey water (pretreated with chemical dosing or filtration), low-salinity (<1 g/kg) river water (pretreated with chemical dosing or filtration), or RO permeate from operation in RO mode as stored in the permeate storage tank. The low-salinity water from other sources may be used as directly supplied or stored in a second, interim storage tank until required. The choice of low-salinity water for PRO mode operation would likely be based on the availability and/or reliability of the low-salinity water source and the relative cost of pure water. Additional piping for alternate streams may include a directional valve and additional circulation pump that allows fluid to be pumped from a natural or external source (river, wastewater treatment plant, ocean, or the like), into the system.

Switching modes—The process of switching modes between desalination (RO) and pressure retarded osmosis (PRO) is a function of the pressure of the system, relative to the osmotic pressure. This system enables two degrees of freedom for switching, fluid resistance and salinity. For RO, the hydraulic pressure must be high enough to force pure water across the membrane (against the concentration gradient). This involves increasing the fluid resistance via variable load or increasing the flow rate with a VFD. The osmotic pressure may be in the range of 1 bar (low salinity feed) to 30 bar (seawater salinity feed). Choice of pressure is discussed below.

For PRO, the hydraulic pressure should be approximately half the osmotic pressure to Allow for reverse flux at an elevated pressure. The time associated with switching modes is controlled by the time needed to change valves 2, 5, 8, and 15. Once the valves change, the water in the feed pipes (initial or mid for RO, high for PRO) must be flushed out of the system and replaced with the new feed. The feed flow rates may remain the same if a variable hydraulic resistance is applied in the brine stream. The permeate flow rate in RO is determined by the hydraulic pressure (or desired recovery ratio). The permeate flow rate in PRO is determined by the salinity difference, membrane parameters, and membrane area. The brine flow rate RO is less than the feed flow rate in RO. The brine flow rate in PRO is greater than the feed flow rate in PRO.

Additional design variations—Use variable resistor load on generator. Varying electrical load will change the torque on the generator, increasing mechanical resistance on the hydraulic motor. Use constant electrical load, use gearing between hydraulic motor and generator. Keeping the electrical load constant so the generator torque is constant, but using a mechanical gearbox to increase mechanical resistance on the hydraulic motor. Regarding a single speed gearbox, the pros include most mechanically simple, no active parts, while the cons include set output torque, have to find optimum between 2 modes. Regarding the use of a two speed gearbox so as to tune for pressure drops at RO and PRO mode, the pros include can use 1 gear set for each operating pressure, while the cons include active components to switch gears, another point of maintenance. Regarding CVT—most efficient—"infinite" gear combinations, and the pros include can follow system ramping, although unsure of usefulness when trying to build pressure and the cons include most maintenance required, may be hard to maintain/implement at a large scale. Specifying different energy recovery devices for PRO (turbine) and RO (pressure exchanger) modes. This means dividing the process with a directional value to use pressure-to-electrical energy conversion (turbine) in PRO mode and pressure-to-pressure energy recovery (pressure exchanger) in RO mode. The directional valve would be placed at the outlet of the membrane and receive high pressure saline water.

Figure 9:
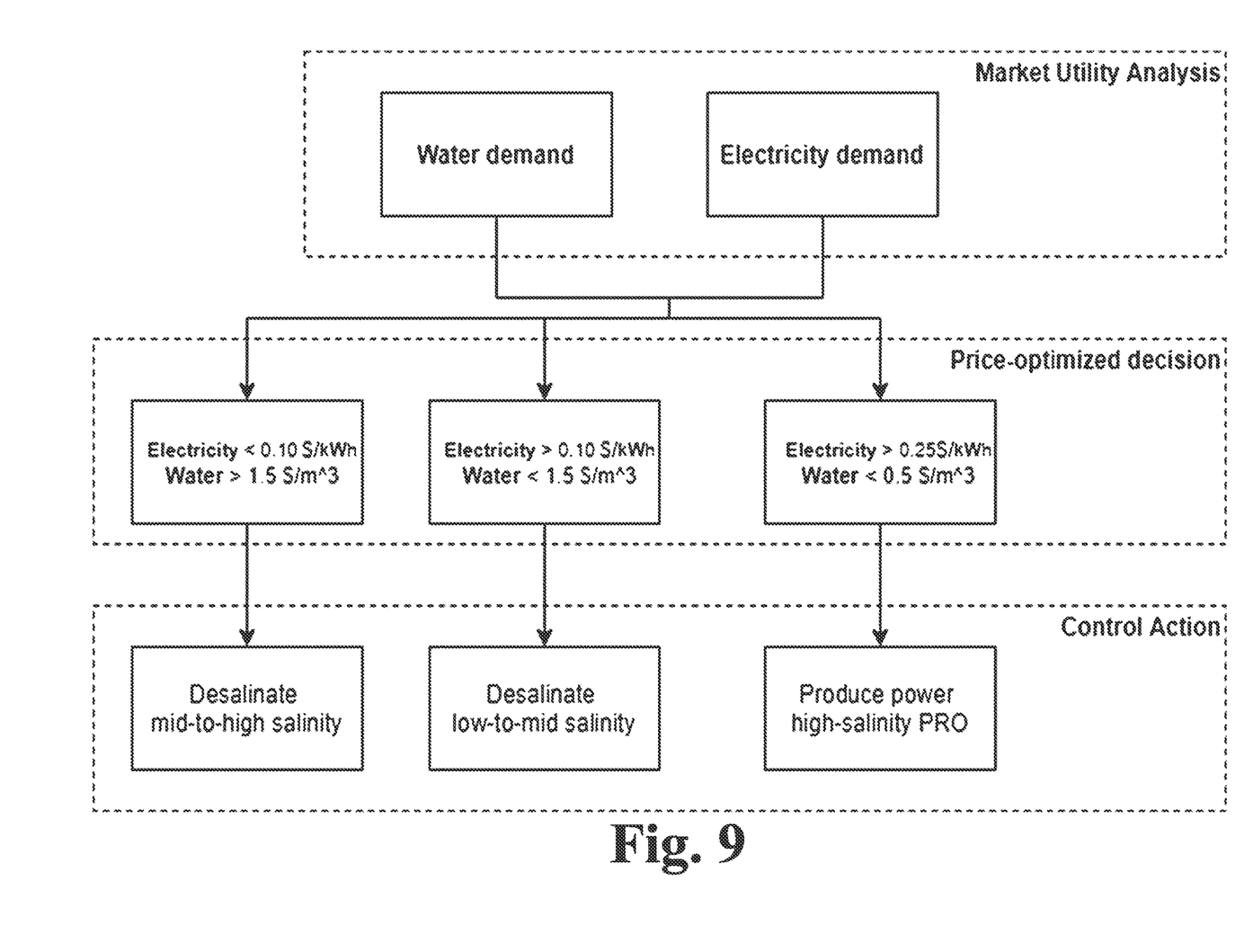
FIG. 9 schematically illustrates the operational paradigm for the system of FIG. 8.

Intelligent decision making framework—Forecasting the fluctuation of energy price is necessary for understanding the market conditions in the most efficient markets. Especially for large, nonlinear systems, errors between day-ahead bids and real-time costs can cause thousands to millions of dollars. Optimization of control or reinforcement learning is important as the system should operate in the most cost-effective option of two or more discrete states (either RO or PRO). There is a minimum time required between consecutive switches (associated with system size) that may be as short as 5 minutes or as long as one day. This time is typically determined by an algorithm that is able to optimize the discrete state (position of valves and pumps) based on the predicted market conditions, following the decision-making framework (see FIG. 9). An optimal control algorithm would be used to determine the rotational speed of the feed pump using a VFD, the position of each solenoid valve, and the on/off actuation of each circulation pump. The control of the VFD may be instantaneous, switched with valves/circulation pumps, or fixed at a constant speed. An optimization or machine learning algorithm would encode sequences or time-based relationships in the latent space. Example algorithms may include mixed integer linear programming, transformers, or recurrent neural networks. The computation would be done online in either a microcontroller (for small applications), programmable logic controller (mid-sized applications), or a large computer (large-sized applications). Alternatively, computation can be done with cloud infrastructure if communication between a controller and the cloud has a latency of <50 ms or so. In PRO mode, the circulation pump in the permeate side and the high salinity brine line must be actuated to overcome hydraulic friction in the pipes. In RO mode, the circulation pump in the mid salinity brine line may be actuated to overcome hydraulic friction in the pipes. This condition happens when the system needs to desalinate from low to high salinity according to the decision making framework. No check valves may be included in the dilute or permeate stream, as flow needs to move in both directions. A check valve may be used directly downstream from the feed pump to eliminate or minimize the possibility of back flow when switching modes.

Example 1

A system for power production, wherein the system includes a first vessel having a first portion, a second portion, and a highly permeable salt-rejecting membrane positioned therebetween. A first port is operationally connected to the first portion. A second port is operationally connected to the first portion. A third port is operationally connected to the second portion, and a fourth port is operationally connected to the second portion. A high-pressure pump is operationally connected to the third port for directing fluid into the second portion. A brine reservoir for storing highly concentrated saline solution is provided, as is a saline reservoir for storing moderately concentrated saline solution. A first three-way valve is provided having a first outlet operationally connected to the high-pressure pump, a first inlet operationally connected to the brine reservoir, and a second inlet operationally connected to the saline reservoir. An energy recovery device (typically a turbine) is connected in fluidic communication with the fourth port and is typically connected in electric communication with a power grid. A second three-way valve is provided having a third inlet operationally connected to the energy recovery device, a second outlet operationally connected to the brine reservoir, and a third outlet operationally connected to the saline reservoir. A check valve is operationally connected to the first port. A gate valve is operationally to the second port. A circulation pump is provided having a circulation pump inlet and a circulation pump outlet operationally connected to the gate valve. A low salinity reservoir is operationally connected to the gate valve, to the circulation pump inlet, and to the check valve. A microprocessor is operationally connected to the first three-way valve, to the second three-way valve, to the gate valve, to the circulation pump, and to the high-pressure pump.

The high-pressure pump provides sufficient pressure to the second portion to overcome osmotic pressure across the membrane to achieve reverse osmosis mode. When energized, the circulation pump provides sufficient pressure to the first portion to restore osmosis across the membrane to achieve pressure retarded osmosis mode.

In reverse osmosis mode, the high-pressure pump supplies moderately concentrated saline solution to the second portion, wherein the moderately concentrated saline solution is concentrated to brine in the second portion, wherein the brine is circulated from the second portion through the energy recovery device to the brine reservoir, and wherein purified water is recovered from the first portion.

In pressure retarded osmosis mode, the high-pressure pump supplies brine to the second portion, wherein the brine is diluted to moderately concentrated saline solution in the second portion, wherein the moderately concentrated saline solution is circulated from the second portion through the energy recovery device to the moderately concentrated saline solution reservoir, and wherein low salinity water is pumped into the first portion.

The microprocessor automatically runs the system in reverse osmosis mode when energy costs are below a predetermined value and wherein the microprocessor automatically runs the system in pressure retarded osmosis mode when energy costs are above the predetermined value.

Example 2

The dual reverse osmosis/pressure retarded osmosis plant as described above may be operated as follows. When electricity costs less than a first predetermined price, moderate salinity water is pumped into the first portion of a pressure vessel having first and second portions separated by a water permeable/salt impermeable osmotic membrane to yield desalinated permeate in the second portion and brine in the first portion. When electricity costs greater than the first predetermined price, low salinity water is pumped into the second portion and brine is pumped into the first portion to yield pressurized moderate salinity water in the second portion which is run through an energy recovery device to generate electricity. Herein, the salinity of the low salinity water is lower than the salinity of the moderate salinity water, and the salinity of the moderate salinity water is lower than the salinity of the brine.

Typically, operation of the dual reverse osmosis/pressure retarded osmosis plant is controlled by a microprocessor and will occur automatically. Recovered energy is sold to a power grid or the like, as the energy recovery device is typically a turbine or like generator of electricity and is in electric communication with a power grid. Alternately, some or all of the recovered energy may be stored in a battery for later use.

The high pressure pump as discussed above may be an axial piston pump, centrifugal pump, or the like. The turbine may be a Pelton turbine, a Francis turbine, an axial piston pump operated as a turbine, a cross flow turbine, or the like. The pressure exchanger may be a positive displacement pressure exchanger (most efficient at the best efficiency point), a direct contact pressure exchanger (better for a system that is switching more often), or the like. The directional valves may be solenoid valves, spool valves, gate valve, ball valve, combinations thereof, and/or the like. The check valves may be Tesla valves, swing valves, stop valves, ball valves, combinations thereof, or the like. The variable frequency drive(s) may be a variable pitch drive, a variable traction drive, a hydraulic hydrostatic drive, a hydro-viscous drive, a direct current drive, an alternating current drive, an eddy current coupling drive, or the like. Pipe materials include 304/316/430 stainless steel, duplex steel, copper, brass, bronze, and the like.

While the present disclosure has been described with reference to certain embodiments, it will be apparent to those of ordinary skill in the art that nigh-infinite other embodiments and implementations are possible that are within the scope of the present disclosure without departing from the spirit and scope of the present disclosure. Accordingly, it should be understood that the disclosure is not limited to any embodiment described herein. It should also be understood that the phraseology and terminology employed above are for the purpose of describing the disclosed embodiments, and do not necessarily serve as limitations to the scope of the disclosure.

The invention claimed is:

1. A method of operating a dual reverse osmosis/pressure retarded osmosis plant, comprising:

a) when electricity costs less than a first predetermined price, moderate salinity water is pumped into the first portion of a pressure vessel having first and second portions separated by a water permeable/salt impermeable osmotic membrane positioned in a membrane module to yield desalinated permeate in the second portion and brine in the first portion; and
b) when electricity costs greater than the first predetermined price, low salinity water is pumped into the second portion and brine is pumped into the first portion to yield pressurized moderate salinity water in the second portion which is run through an energy recovery device to generate electricity; and
c) flushing all pipes and vessels when switching between steps a and b;

wherein steps a and b are controlled by a microprocessor and occur automatically;

wherein step a is defined as RO mode and step b is defined as PRO mode;

wherein flux across the water permeable/salt impermeable osmotic membrane is automatically calculated using $$J_w \approx A(\Delta\pi - \Delta P) = A\left(\frac{\pi_f e^{-\frac{J_w s}{D}} - \pi_p e^{\frac{J_w}{k}}}{1 + \frac{B}{J_w}\left[e^{\frac{J_w s}{D}} - e^{\frac{J_w}{k}}\right]} - \Delta P\right);$$

wherein $J_w$ is the flux of water across the membrane, A is the membrane permeability to water, $\Delta\pi$ is the osmotic pressure difference, and $\Delta P$ is the hydraulic pressure difference across the membrane, S is the membrane support layer structural parameter, k is the mass transfer coefficient in the membrane module, B is the membrane permeability to salts, and D is the diffusivity of salt in water;

wherein power density W* of step a is automatically calculated using $$W^* = J_w \Delta P;$$

wherein exergetic efficiency $\eta_{II}$ is automatically calculated as a function of the process net work $W_{net}$ and the respective process least work $W_{least}$ using $$\eta_{II,RO} = \frac{W_{least}}{W_{net,RO}};$$

wherein exergetic efficiency $\eta_{II}$ is automatically calculated as a function of the process net work $W_{net}$ and the respective process least work $W_{max}$ using $$\eta_{II,PRO} = \frac{W_{net,RO}}{W_{max}};$$

wherein least work of reverse osmosis $W_{least}$ is defined as the minimum energy of separation using $$W_{least} = m_p\left[(g_p - g_b) - \frac{1}{r}(g_f - g_b)\right];$$

wherein m represents the mass flow rate, the recovery ratio is represented by a ratio of permeate to feed flow rates $$r = \frac{m_p}{m_f},$$

and g is the Gibbs free energy of the respective solution;

wherein PRO mode operates at the max power density of $0.5\Delta\pi$ and RO mode operates at a pressure associated with a standard recovery of r=0.5;

wherein net work is automatically calculated as a summation of the input and output work using $$W_{net} = \frac{V_f \Delta P_{HPP}}{\eta_{HPP}} + \eta_{ERD} V_b \Delta P_{ERD};$$

wherein V is the volumetric flow rate and subscripts b, HPP, and ERD represent the brine in RO mode and outlet concentrate in PRO mode, high pressure pump, and energy recovery device, respectively;

wherein $$W_{max,PRO} = -W_{least,RO};$$

wherein relative economic profit of each respective mode is automatically calculated for a given combination of system operational inputs as costs and economic inputs (price of pure water and price of electricity) as revenue using $$R_{RO,net} = (C_p m_p + C_b m_b) - \left(\frac{W_{least}}{\eta_{II,RO}} C_e + C_f m_f\right);$$

and $$R_{PRO,net} = (W_{max}\eta_{II} C_e + C_f m_f) - (C_p m_p + C_b m_b);$$

where R and C represent the net revenue and cost or selling price associated with the respective water or electricity source, respectively;

wherein a peak price ratio PPRe is defined as the ratio between the sale price of electricity for producers and the baseload cost of electricity for consumers where the economic surplus from RO and PRO are equal and accounts for any additional incentives for producing electricity during peak hours, where the PPRe is automatically calculated using $$PPR_e = \frac{1}{W_{max}\eta_{II} C_e}[R_{RO,net} + (C_p m_p + C_b m_b - C_f m_f)];$$

wherein the dual reverse osmosis/pressure retarded osmosis plant operates in RO when hydraulic pressure is sufficiently high to force pure water across the water permeable/salt impermeable osmotic membrane;

wherein the dual reverse osmosis/pressure retarded osmosis plant operates in PRO when hydraulic pressure is be half the osmotic pressure;

wherein the salinity of the low salinity water is lower than the salinity of the moderate salinity water; and wherein the salinity of the moderate salinity water is lower than the salinity of the brine.

2. The method of claim 1 wherein the energy recovery device is a turbine in electric communication with a power grid.

3. The method of claim 1 wherein a circulation pump is positioned in hydraulic communication with the first portion of the pressure vessel, and wherein when the system operates in PRO mode, the circulation pump is energized to overcome pipe friction and urge crossflow.

* * * * *